(12) United States Patent
Kothari

(10) Patent No.: US 11,268,315 B2
(45) Date of Patent: *Mar. 8, 2022

(54) APPARATUS, SYSTEM, AND METHOD FOR PREVENTING VEHICLE DOOR RELATED ACCIDENTS

(71) Applicant: Be Topnotch, LLC, Henrico, VA (US)

(72) Inventor: Ankit Dilip Kothari, Henrico, VA (US)

( * ) Notice: Subject to any disclaimer, the term of this patent is extended or adjusted under 35 U.S.C. 154(b) by 361 days.

This patent is subject to a terminal disclaimer.

(21) Appl. No.: 16/260,054

(22) Filed: Jan. 28, 2019

(65) Prior Publication Data

US 2019/0153771 A1 May 23, 2019

Related U.S. Application Data

(63) Continuation of application No. 15/487,424, filed on Apr. 13, 2017, now Pat. No. 10,190,357, which is a continuation of application No. 15/269,941, filed on Sep. 19, 2016, now Pat. No. 9,637,965.

(60) Provisional application No. 62/256,707, filed on Nov. 18, 2015.

(51) Int. Cl.
| | |
|---|---|
| *B60Q 9/00* | (2006.01) |
| *E05F 15/73* | (2015.01) |
| *E05F 15/40* | (2015.01) |
| *B60Q 1/32* | (2006.01) |
| *E05F 15/76* | (2015.01) |

(52) U.S. Cl.
CPC .............. *E05F 15/73* (2015.01); *B60Q 1/323* (2013.01); *B60Q 9/00* (2013.01); *E05F 15/40* (2015.01); *E05F 15/76* (2015.01); *E05F 2015/767* (2015.01); *E05Y 2400/54* (2013.01); *E05Y 2900/531* (2013.01)

(58) Field of Classification Search
CPC ........... E05F 15/73; E05F 15/40; E05F 15/76; B60Q 1/323; B60Q 9/00
See application file for complete search history.

(56) References Cited

U.S. PATENT DOCUMENTS

| | | | |
|---|---|---|---|
| 9,637,965 B1 * | 5/2017 | Kothari | .................. B60J 5/0493 |
| 10,190,357 B2 * | 1/2019 | Kothari | .................. E05F 15/76 |
| 2011/0260848 A1 * | 10/2011 | Rodriguez Barros | . B60Q 1/323 340/438 |

(Continued)

*Primary Examiner* — Hussein Elchanti

(74) *Attorney, Agent, or Firm* — Ellenoff Grossman & Schole LLP; James M. Smedley; Alex Korona

(57) ABSTRACT

This apparatus, system, and method for preventing vehicle door related accidents will help to detect oncoming traffic and/or nearby external objects when an occupant of the vehicle or the vehicle processor demonstrates an intent to open the vehicle door, and it would generate an alert for the vehicle users, or generate an external alert for the outside users, or automatically stop the vehicle door from opening further if there was a possibility of an accident involving the vehicle doors or its users. This invention comprises of an internal alert mechanism to alert vehicle users about the oncoming traffic and/or nearby external objects. This invention also comprises of an external alert mechanism, which would generate alert externally that vehicle door is about to be opened. This invention also comprises of a feature to restrict the vehicle doors from opening further when there is a potential for door related accident.

10 Claims, 4 Drawing Sheets

(56) References Cited

U.S. PATENT DOCUMENTS

| | | | | |
|---|---|---|---|---|
| 2014/0049058 A1* | 2/2014 | Kudoh | ............... | E05B 79/06 |
| | | | | 292/336.3 |
| 2014/0313335 A1* | 10/2014 | Koravadi | ......... | H04N 5/23216 |
| | | | | 348/148 |
| 2015/0002288 A1* | 1/2015 | Lee | ................ | B60Q 1/46 |
| | | | | 340/471 |
| 2016/0290019 A1* | 10/2016 | Nagata | ............... | E05B 77/06 |
| 2017/0089114 A1* | 3/2017 | Rider | ................ | G01L 19/083 |

\* cited by examiner

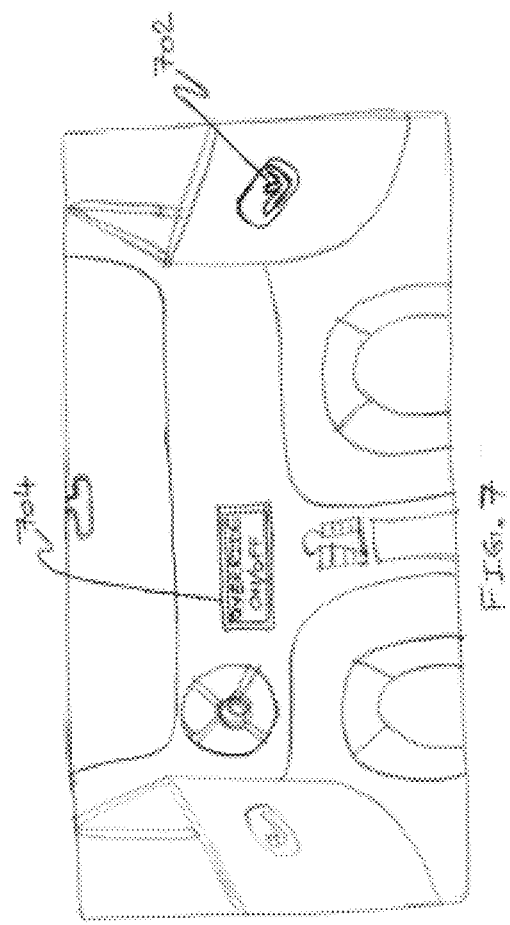
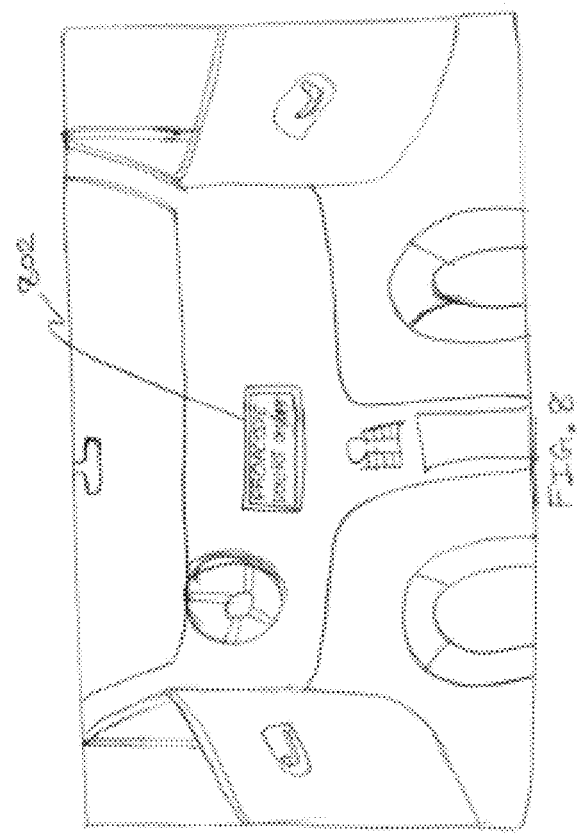

APPARATUS, SYSTEM, AND METHOD FOR PREVENTING VEHICLE DOOR RELATED ACCIDENTS

CROSS-REFERENCE TO RELATED APPLICATIONS

This application is a Continuation of U.S. patent application Ser. No. 15/487,424 entitled "Apparatus, System, and Method for Preventing Vehicle Door Related Accidents" filed on Apr. 13, 2017 which is a Continuation-in-Part of U.S. patent application Ser. No. 15/269,941 entitled "Proactive Vehicle Doors to Prevent Accidents" filed on Sep. 19, 2016, which claims priority to U.S. Provisional Patent Application Ser. No. 62/256,707, entitled "Proactive Vehicle Doors to Prevent Accidents" filed on Nov. 18, 2015. The content of all of the aforementioned patent applications are incorporated herein by reference in their entirety.

BACKGROUND

It often occurs that when a vehicle door is opened without paying close attention to the oncoming traffic (for example: another vehicle, cyclist, motorbike, scooter, people, etc), then there is a potential of an accident if the traffic either coming from behind or even from the front come and hit that open vehicle door. In this situation, there is also a risk of the user themselves getting hit by traffic if they weren't paying attention while opening their vehicle door.

In addition to above, it also often occurs that when a vehicle user opens their vehicle door without paying close attention to the external objects, then there is a potential for an accident as that vehicle door can hit the external objects (for example: another vehicle parked in parking lot, building wall if vehicle was parked next to building wall, road sign pillar/pole, water hydrant, etc). To further explain this problem, let's take the example of the parking lots. It's quite common in the parking lots for the vehicle doors to hit other vehicles while the user is either trying to get in or get out of their vehicle.

Overall, the vehicle door related accidents are increasing more and more, and can result in dents and damages on the vehicle itself as well as other external objects/vehicles. In addition, there are costs involved to fix those dents/damages, rise in insurance premiums occur due to such accidents, and so on. In fact, in some cases, people even run away after they hit another vehicle with their vehicle door without reporting those accidents resulting in hit and run cases. Also, currently there is no internal alert mechanism or indicator on the vehicle notification system or the vehicle doors itself to indicate to the vehicle door operators that there is a risk of an accident when there are external objects or oncoming traffic. Also, currently there isn't any type of external alert mechanism (for example: an indicator, notification, digital display, lights, etc) to external/outside people, oncoming traffic or nearby external objects that the vehicle door is about to be opened, which can provide an alert to those external things and help to prevent accidents. In addition, currently there also isn't an artificial intelligence module for the proactive vehicle doors that would constantly gather, analyze and provide proactive suggestions or even take the necessary actions in order to help prevent any vehicle door related accidents.

However, any of these vehicle door related accidents can be prevented if the vehicle doors have a mechanism for external object identification and proactive self-stopping and notification system such that the vehicle doors would automatically stop from opening further after a certain point when there is a risk of oncoming traffic hitting the door or another external object hitting the vehicle door. Also, if an indicator was present on the vehicle notification system and/or on the vehicle doors itself that shows when it's safe to open the door, that would also help to prevent any vehicle door related accidents. Also, if an external alert mechanism (for example: an indicator, notification, digital display, lights, etc) was present on the vehicle, then it would alert the external/outside people, oncoming traffic and external objects, and that would also help to prevent accidents. In addition, if an artificial intelligence module related to the vehicle doors was present, then it would constantly gather, analyze and provide proactive suggestions or even take the necessary actions in order to help prevent future accidents.

BRIEF SUMMARY

This apparatus, system, and method for preventing vehicle door related accidents will help to detect oncoming traffic and/or nearby external objects when an occupant of the vehicle or the vehicle processor demonstrates an intent to open the vehicle door, and it would generate an alert for the vehicle users, or generate an external alert for the outside users, or automatically stop the vehicle door from opening further if there was a possibility of an accident involving the vehicle doors or its users. This invention comprises of an internal alert mechanism to alert vehicle users about the oncoming traffic and/or nearby external objects. This invention also comprises of an external alert mechanism, which would generate alert externally that vehicle door is about to be opened. This invention also comprises of a feature to restrict the vehicle doors from opening further when there is a potential for door related accident.

This invention also comprises of an artificial intelligence module, which would constantly gather data, analyze and provide proactive suggestions or even take necessary actions in order to help prevent any vehicle door related accidents.

This solution will help to detect oncoming traffic and/or nearby external objects when the vehicle door is being opened, and it would automatically stop the vehicle door from opening further if there is a possibility of an accident involving the vehicle doors or its users. Note: oncoming traffic can be anything that can cause damage to the vehicle door, such as, another vehicle, cyclist, people, motorbike, scooter, etc that are either coming from front or from behind. Note: an external object can also be anything that can cause damage to the vehicle door. For example: another vehicle parked in parking lot, building wall if vehicle was parked next to building wall, road sign pillar/pole, water hydrant, etc. This solution will help to prevent accidents and also indirectly remove the fear from the vehicle users that they might hit another object while opening their vehicle doors and vice versa. Note: Even in those situations when the vehicle door hasn't even been opened at all, however, if the user has indicated their intent to open the door (for example: hold the vehicle door handle, unbuckle the seat belt, turn off the vehicle ignition, press the button or switch to open the door, voice request to open the vehicle door, mobile app request to open the vehicle door, preset stand-alone action of user that demonstrates an intent of opening the vehicle door, sequence or combination of actions which indicate that the user is about to open the vehicle door, etc), then the proactive vehicle door system would detect those actions using different methods (for example: using sensors within the vehicle door handle, using sensors within the seat belt buckle, other sensors, etc). And once the intent to open the door is identified, the proactive vehicle door system will either proactively stop the doors from opening at all, or allow partial opening of the doors, or lock the doors, or alert the occupants of the vehicle of any potential hazards, or alert the external users or other self-driving vehicles that the vehicle's door is about to open, with the intent to prevent an accident involving the vehicle doors.

In case of self-driving vehicles, when the vehicle door hasn't been opened, however, if the self-driving vehicle is about to open the door i.e. intends to open the door, then the self-driving vehicle would communicate that information to the vehicle computer, which would proactively stop the doors from opening at all or even lock the doors if there is a detection of potential accident involving the vehicle doors.

This invention will also notify the vehicle users using an indicator on the vehicle door and/or an existing notification systems in the vehicle that the vehicle door has been restricted from opening further due to the potential of an accident. Such an indicator can also be located at one or multiple other locations in the vehicle, either inside or outside, as long as the vehicle occupant can view that indicator.

Even in the situation where the vehicle door isn't restricted from opening, however, the potential of a vehicle door related accident does exist, then this invention will still have an internal alert mechanism, which will alert the vehicle users about the external object or the oncoming traffic using an internal alert indicator within the vehicle. Such an internal alert indicator can be located anywhere on the vehicle, inside or outside the vehicle, as long as the vehicle occupant can view that alert indicator.

Also, this invention will also have an external alert mechanism (for example: using an indicator, notification, digital display, lights, etc) that would alert the external/outside people, oncoming traffic or nearby external objects that the vehicle door is about to be opened, which would also help to prevent accidents. In addition, this invention will also comprise of an artificial intelligence module within the proactive vehicle door system, where the module would constantly gather and analyze i.e. learn from the regular actions of the users related to the vehicle doors (such as incorrectly opening the vehicle door at a particular time of the day, or at a particular place, or in a particular sequence of actions, etc), and then it would proactively inform the user or users to avoid making those same mistakes again, and therefore, help to prevent future accidents.

According to an embodiment of the present invention, a vehicle door safety apparatus comprising: a door safety mechanism; a processor connected to the door safety mechanism and configured to: receive data about the vehicle's external environment collected by a plurality of sensors or cameras integrated into the vehicle; identify an object in the vehicle's external environment that represents a potential contact hazard when a door of the vehicle is opened; identify using one or more sensors when the occupant of the vehicle demonstrates an intent to open the door of the vehicle; and activate the door safety mechanism in order to prevent an accident involving door of the vehicle and an object.

According to an embodiment of the present invention, the vehicle door safety apparatus comprising of the processor configured to: deactivate the door safety mechanism when the object that previously represented a potential contact hazard is no longer in the vehicle's external environment or does not represent a potential contact hazard anymore when a door of the vehicle is opened.

According to an embodiment of the present invention, the vehicle door safety apparatus wherein an intent to open the door of the vehicle is a stand-alone user action or a combination of user actions which indicate to the door safety mechanism that the occupant of the vehicle is about to open the vehicle door.

According to an embodiment of the present invention, the vehicle door safety apparatus wherein an intent to open the door of the vehicle can also be expressed by a processor of an automated, connected, autonomous or semi-autonomous vehicle.

According to an embodiment of the present invention, the vehicle door safety apparatus wherein the processor is further configured to: cause the door safety mechanism to generate one or more internal alerts directed to an occupant of the vehicle when the likelihood of contact with the object reaches or exceeds a predetermined threshold.

According to an embodiment of the present invention, the vehicle door safety apparatus wherein the processor is further configured to generate one or more external alerts directed to a person or object located outside of the vehicle.

According to an embodiment of the present invention, the vehicle door safety apparatus wherein an object in the vehicle's external environment is a connected object which communicates at least one or more information about its location, speed, direction or object type to the nearby connected objects to make them aware about an object.

According to an embodiment of the present invention, the vehicle door safety apparatus wherein the vehicle is a connected vehicle which communicates information about intent to open the door of the vehicle or information about an object in the vehicle's external environment to nearby external connected objects that are within its range, wherein external connected objects can also include the object itself when it's a connected object.

According to an embodiment of the present invention, the vehicle door safety apparatus wherein the door safety mechanism prevents the door from opening when likelihood of contact with the object reaches or exceeds a predetermined threshold.

According to an embodiment of the present invention, a vehicle door safety apparatus comprising: a door safety mechanism; a processor connected to the door safety mechanism and configured to: receive sensor data about the vehicle's external environment collected by a plurality of sensors integrated into the vehicle; identify an object in the vehicle's external environment that represents a potential contact hazard when a door of the vehicle is opened; cause the door safety mechanism to generate one or more internal alerts directed to an occupant of the vehicle; wherein one or more internal alerts are either inside or outside the vehicle as long as they are visible to an occupant of the vehicle.

According to an embodiment of the present invention, the vehicle door safety apparatus wherein when one or more sensors embedded in the vehicle identify that an occupant of the vehicle has demonstrated an intent to open the door of the vehicle, the door safety mechanism generates one or more internal alerts directed to an occupant of the vehicle when an object in the vehicle's external environment represents a potential contact hazard.

According to an embodiment of the present invention, the vehicle door safety apparatus wherein one or more internal alerts include a visual indicator either on the vehicle door, glass window, door mirror assembly, HUD display or dashboard display screen of the vehicle as long as the visual indicator is visible to occupant of the vehicle.

According to an embodiment of the present invention, the vehicle door safety apparatus wherein one or more internal alerts include activation of display screens within the vehicle that display the rear view of the vehicle using one or more cameras installed on the vehicle.

According to an embodiment of the present invention, a vehicle door safety system comprising: a vehicle; a processor; one or more sensors embedded in the vehicle; non-volatile memory comprising computer readable instructions stored therein, wherein the instructions cause the processor to: identify using one or more sensors when the occupant of the vehicle demonstrates an intent to open the door of the vehicle; wherein an intent to open the door of the vehicle is a stand-alone user action or a combination of user actions which indicate to the door safety mechanism that the occupant of the vehicle is about to open the vehicle door; and cause a door safety mechanism to generate one or more external alerts directed to a person or object located outside of the vehicle when the occupant of the vehicle demonstrates an intent to open the door of the vehicle.

According to an embodiment of the present invention, the vehicle door safety system wherein the processor deactivates one or more external alerts when an occupant of the vehicle either no longer demonstrates an intent to open the door of the vehicle, or once opens and closes the door of the vehicle, or manually turns off the door safety mechanism either one-time or forever until the door safety mechanism is manually turned on again by the occupant of the vehicle.

According to an embodiment of the present invention, the vehicle door safety system wherein an intent to open the door of the vehicle can also be expressed by a processor of an automated, connected, autonomous or semi-autonomous vehicle.

According to an embodiment of the present invention, the vehicle door safety system wherein the vehicle is a connected vehicle which communicates information about intent to open the door of the vehicle to nearby external connected objects that are within its range to help prevent vehicle door related accidents.

According to an embodiment of the present invention, the vehicle door safety system further comprising: a highly reflective material that is glued or attached to the vehicle door's inner trim or edge, wherein when the door of the vehicle is opened, the reflective material shines or illuminates and provides an alert to the external users or automated vehicles that the door of the vehicle is open.

According to an embodiment of the present invention, a method for vehicle door safety, wherein the method comprising: receiving data about the vehicle's external environment collected by a plurality of sensors or cameras integrated into the vehicle; identifying an object in the vehicle's external environment that represents a potential contact hazard when a door of the vehicle is opened; identifying using one or more sensors when an occupant of the vehicle demonstrates an intent to open the door of the vehicle; and activating a door safety mechanism in order to prevent an accident involving door of the vehicle and an object.

The present invention will use sensors to identify when the vehicle user is about to open the vehicle door, or to identify the external objects or oncoming traffic, and provide a self-stopping feature on the vehicle doors that can help to prevent accidents.

While the illustrated system is primarily directed as original built-in equipment on a vehicle, it is within the spirit and scope of the invention to be able to retrofit the disclosed system on existing vehicles as well.

Note: Any of the above mentioned features on the system are just for exemplary purposes, however, as technology advances in future, additional options can be added to this system to enhance the use of such self-stopping feature on the vehicle doors to prevent accidents.

Any components of the system described above would continue to work/function even when the vehicle isn't turned on i.e. the system would run using the vehicle's built-in rechargeable battery in this case.

One or ordinary skill in the art would recognize that this invention would be applicable to not only the vehicle doors of traditional vehicles, but also semi-autonomous vehicles, connected vehicles as well as autonomous self-driving vehicles without departing from the spirit and scope of the present invention. In other words, this invention would be applicable to any type of vehicles that have doors or an opening to be able to come out of the vehicle. In addition, whether it's the user of the vehicle who opens or closes the door or the software module that opens or closes the door automatically based on user input or the autonomous self-driving vehicle's instructions, all of those situations would be valid and considered within the spirit and scope of the present invention.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The disclosure can be better visualized by turning now to the following drawings.

BRIEF DESCRIPTION OF THE DRAWINGS

FIG. 7 illustrates exemplary on/off switch or mechanism to be able to activate or deactivate the manual override function of the proactive vehicle door system. For example, as illustrated in the diagram, the manual override function can be in the form of central button available on the dashboard, which when turned on i.e. activated, would no longer stop any of the vehicle doors from opening based on the sensor detection. Another example of the manual override function can be a button or manual trigger available on the door that allows the user of that door to active or deactivate the vehicle door's manual override function. As illustrated in the diagram, an exemplary small handle is provided right behind the vehicle door handle, where a user can put a couple of their fingers on the small handle and couple of fingers on the big handle, and then pull both those handles present on the vehicle door at the same time to activate the manual override function of the vehicle, and therefore, further open the vehicle door.

FIG. 8 illustrates exemplary on/off switch to be able to activate or deactivate the entire proactive vehicle door system. When the switch is turned on, then the proactive vehicle door system is activated and would prevent the vehicle doors from potential accidents. When the switch is turned off, then the proactive vehicle door system is deactivated and would no longer restrict the vehicle doors from opening further even if there is a potential for an accident.

Figure 2:
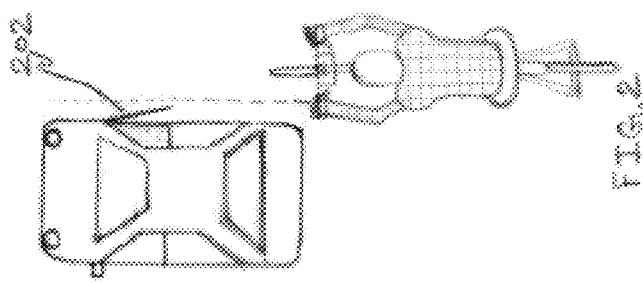
FIG. 2 is a diagram illustrating a door being opened for a vehicle where a cyclist is coming from behind at the same time. This diagram illustrates that the proactive vehicle door system has restricted the vehicle door from opening further after a certain point since there is a potential for an accident due to oncoming traffic i.e. a cyclist along with their cycle in this situation.
Figure 4:
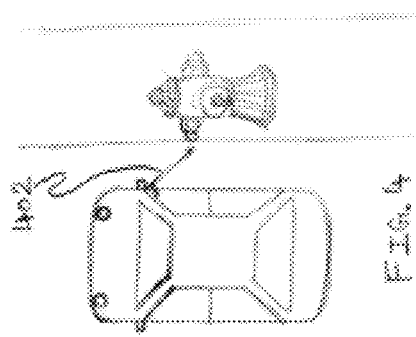
FIG. 4 is a diagram which illustrates a vehicle parked on the street and that its proactive vehicle door system has restricted the vehicle's door from opening further after a certain point since there is a potential for an accident due to nearby external object i.e. a fire hydrant in this situation.
Figure 1:
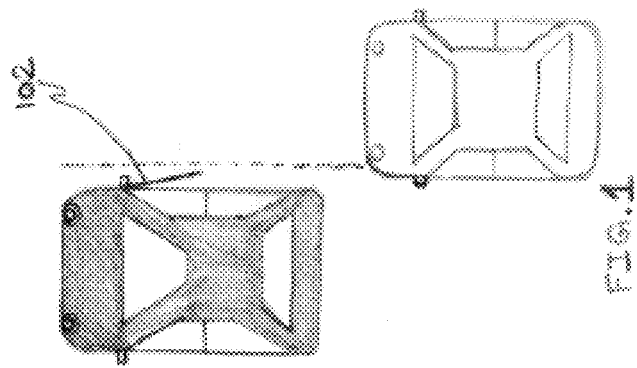
FIG. 1 is a diagram illustrating a door being opened for a vehicle where another vehicle is coming from behind at the same time. This diagram illustrates that the proactive vehicle door system has restricted the front vehicle's door from opening further after a certain point since there is a potential for an accident due to oncoming traffic i.e. another vehicle in this situation.
Figure 3:
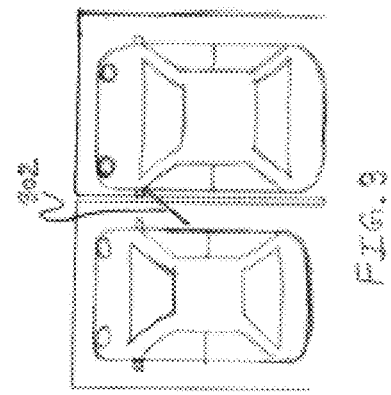
FIG. 3 displays two vehicles parked closely in a parking lot and one of the vehicle's door is being opened. This diagram illustrates that the proactive vehicle door system has restricted the vehicle door from opening further after a certain point since there is a potential for an accident due to nearby external object i.e. another vehicle in this situation.

The disclosure and its various embodiments can now be better understood by turning to the following detailed description of the preferred embodiments. It is expressly understood that the embodiments as defined by any current or future claims may be broader than the illustrated embodiments described below.

DETAILED DESCRIPTION

This apparatus, system, and method for preventing vehicle door related accidents will help to detect oncoming traffic and/or nearby external objects when an occupant of the vehicle or the vehicle processor demonstrates an intent to open the vehicle door, and it would generate an alert for the vehicle users, or generate an external alert for the outside users, or automatically stop the vehicle door from opening further if there was a possibility of an accident involving the vehicle doors or its users. This invention comprises of an internal alert mechanism to alert vehicle users about the oncoming traffic and/or nearby external objects. This invention also comprises of an external alert mechanism, which would generate alert externally that vehicle door is about to be opened. This invention also comprises of a feature to restrict the vehicle doors from opening further when there is a potential for door related accident.

This invention also comprises of an artificial intelligence module, which would constantly gather data, analyze and provide proactive suggestions or even take necessary actions in order to help prevent any vehicle door related accidents.

As shown in FIG. 1-FIG. 4, this solution will help to detect oncoming traffic and/or nearby external objects when the vehicle door is being opened, and it would automatically stop the vehicle door from opening further 102, 202, 302, 402 if there is a possibility of an accident involving the vehicle doors or its users. Note: oncoming traffic can be anything that can cause damage to the vehicle door, such as, another vehicle, cyclist, people, motorbike, scooter, etc. that are either coming from front or from behind. Note: an external object can also be anything that can cause damage to the vehicle door. For example: another vehicle parked in parking lot, building wall if vehicle was parked next to building wall, road sign pillar/pole, water hydrant, etc. This solution will help to prevent accidents and also indirectly remove the fear from the vehicle users that they might hit another object while opening their vehicle doors and vice versa. Note: Even in those situations when the vehicle door hasn't even been opened at all, however, if the user has indicated their intent to open the door (for example: hold the vehicle door handle, unbuckle the seat belt, turn off the vehicle ignition, press the button or switch to open the door, voice request to open the vehicle door, mobile app request to open the vehicle door, preset stand-alone action of user that demonstrates an intent of opening the vehicle door, sequence or combination of actions which indicate that the user is about to open the vehicle door, etc), then the solution would detect those actions (for example: using sensors within the vehicle door handle, using sensors within the seat belt buckle, other sensors, etc) and still proactively stop the doors from opening at all, or allow partial opening of the doors, or lock the doors, or alert the occupants of the vehicle, or alert the external users in order to try and prevent an accident involving the vehicle doors.

In case of self-driving vehicles, when the vehicle door hasn't been opened, however, if the self-driving vehicle is about to open the door i.e. intends to open the door, then the self-driving vehicle would communicate that information to the vehicle computer, which would proactively stop the doors from opening at all or even lock the doors if there is a detection of potential accident involving the vehicle doors.

According to an embodiment of the invention a vehicle door safety system is provided that includes non-volatile memory for storing computer readable instructions, a plurality of sensors integrated into the vehicle, and a processor configured to receive sensor data about the vehicle's external environment collected by the sensors; identify an object in the vehicle's external environment that represents a potential contact hazard when a vehicle door is opened; determine whether the object is likely to come into contact with the door when the door is opened; and activate a door safety mechanism that can either generate an internal alert for the vehicle users, or generate an external alert, or prevent the door from extending into contact with the object when the processor determines that the object represents a contact hazard, within a predetermined degree of probability. The degree of probability of contact with the object could be a probability in the range of 0-100%, but is preferably at least 50% or higher. However, one of ordinary skill will appreciate that any degree of probability may be utilized.

One or ordinary skill in the art would recognize that this invention would be applicable to not only the vehicle doors of traditional vehicles, but also semi-autonomous vehicles, connected vehicles as well as autonomous self-driving vehicles without departing from the spirit and scope of the present invention. In other words, this invention would be applicable to any type of vehicles that have doors or an opening to be able to come out of the vehicle. In addition, whether it's the user of the vehicle who opens or closes the door or the software module that opens or closes the door automatically based on user input or the autonomous self-driving vehicle's instructions, all of those situations would be valid and considered within the spirit and scope of the present invention.

Figure 5:
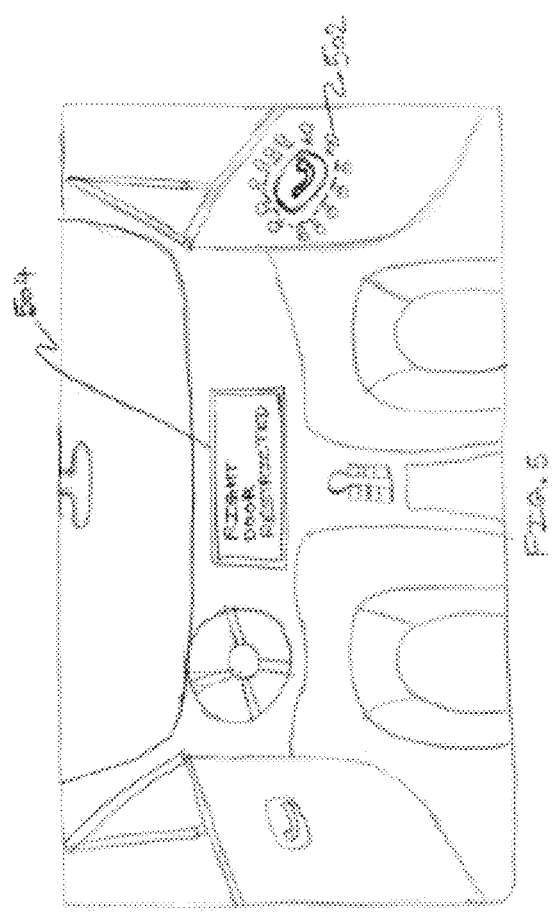
FIG. 5 illustrates an exemplary internal notification system, for example: centrally on the vehicle dashboard as well as individually by lighting the handle of the vehicle door itself, notifying the vehicle user/s that the vehicle door has been restricted from opening further due to the potential of an accident. Note: This illustration is just exemplary, and any other way of internally notifying the vehicle user about the vehicle door would also be within the spirit and scope of present invention.

As shown in FIG. 5, this solution will also notify the vehicle users using an indicator on the vehicle door 502 and/or an existing notification systems 504 in the vehicle that the vehicle door has been restricted from opening further due to the potential of an accident.

One or ordinary skill in the art would recognize that similar to the indicator on the vehicle door 502 as shown in FIG. 5, it can also be located at one or multiple other locations in the vehicle, either inside or outside, as long as the vehicle occupant can view that indicator. For example, such indicator can also be on the trim of the vehicle door, glass window of the vehicle door, smart glass panel or display mounted on the vehicle door, vehicle door handle itself, border of the vehicle door handle unit, interior side of the vehicle door, HUD display, trim of the door mirrors, side of the door mirror compartment, sun visor, dashboard display screen, dashboard notification system, seat headrest, display screen on the seat, and/or other existing notification systems present in the vehicle that are visible to the vehicle occupant.

In another embodiment of the present invention, even in the situation where the vehicle door isn't restricted from opening, however, if the probability of a vehicle door related accident does exist, then this invention will still have an internal alert mechanism, which will alert the vehicle users about the external object or the oncoming traffic using an internal alert indicator on the vehicle. Such an internal alert indicator can be located anywhere on the vehicle, inside or outside the vehicle, as long as the vehicle occupant can view that alert indicator. For example, an alert indicator can be located on the interior side of the vehicle door, trim of the vehicle door, vehicle door handle, border of the vehicle door handle unit, glass window of the vehicle door, smart glass panel or display mounted on the vehicle door, HUD display, trim of the door mirrors, side of the door mirror compartment, sun visor, dashboard display screen, dashboard notification system, seat headrest, display screen on the seat, and/or other existing notification systems present in the vehicle.

Figure 6:
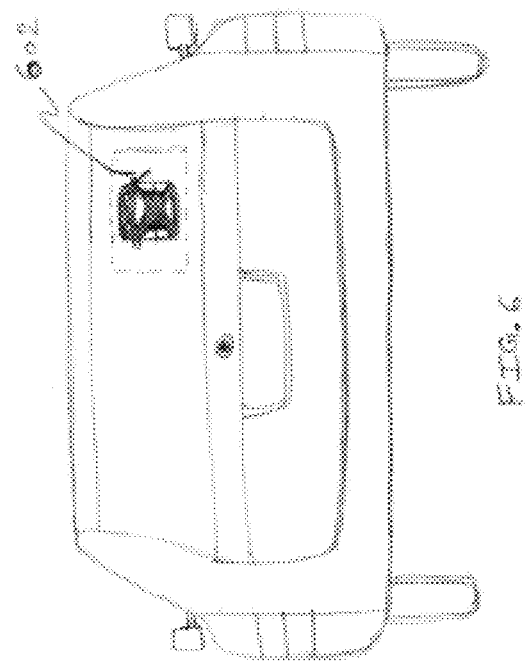
FIG. 6 illustrates an exemplary external alert mechanism/ system, for example: a digital display on the rear windshield, where the proactive vehicle door system of the vehicle would be able to use the external alert mechanism/system to alert the external/outside people, oncoming traffic or nearby external objects that the vehicle door is about to be opened, and therefore, help to prevent accidents. Note: This illustration is just exemplary, and any other way of externally notifying that the vehicle door is about to be opened would also be within the spirit and scope of present invention.

Also, as shown in FIG. 6, this invention will also have an external alert mechanism 602 (for example: using an indicator, notification, digital display, lights, flashing lights, reflective material, etc) that would alert the external/outside people, oncoming traffic or nearby external objects that the vehicle door is about to be opened, which would also help to prevent accidents.

Figure 9:
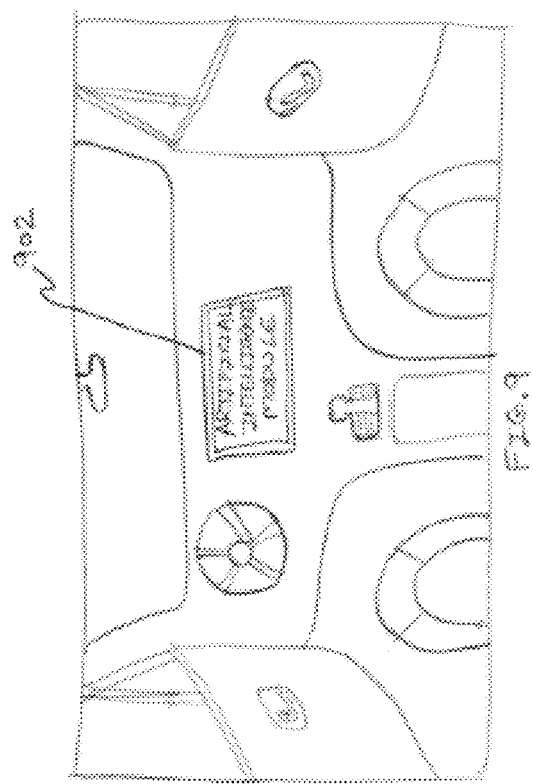
FIG. 9 illustrates an exemplary display associated with the artificial intelligence module available within the proactive vehicle door system. Such artificial intelligence module would constantly gather and analyze i.e. learn from the regular actions of the users related to the vehicle doors and then it would proactively inform the user or users to avoid making those same mistakes again in future, and therefore, help to prevent future accidents.

In addition, as shown in FIG. 9, this invention will also comprise of an artificial intelligence module within the proactive vehicle door system, where the module would constantly gather and analyze i.e. learn from the regular actions of the users related to the vehicle doors (such as incorrectly opening the vehicle door at a particular time of the day, or at a particular place, or in a particular sequence of actions, etc), and then it would proactively inform the user or users to avoid making those same mistakes again, and therefore, help to prevent future accidents.

Note: Whether the vehicle has doors that need to be manually opened by a user or the vehicle has doors that are self-opening automated doors, the solution mentioned here for self-stopping vehicle doors will be applicable in any of those cases.

This solution comprises of one or more sensors for each door of the vehicle, which would detect either the objects that can be potentially hit by the vehicle door while it's opened or those objects that have the potential to come and hit the vehicle door while the vehicle door is being opened. This solution can also comprise of one or more sensors installed in one or more locations in the vehicle such as side mirror assembly, bumper of vehicle, trunk of vehicle, roof of vehicle, etc. which would monitor if there is anything coming from behind which has the potential or probability to hit the vehicle door such as a bicycle, another vehicle, etc and would transfer that information to the vehicle computer/processor, which would thereafter transmit signals to the proactive vehicle door system to take different actions such as generate an alert for vehicle user opening the door, or restrict or block the door from opening, etc. This solution can also comprise of additional sensors that would detect when the vehicle user is about to open the vehicle door. These one or more sensors can be placed in any part of the vehicle, internally or externally, as long as they are placed such that they can gather all the necessary information and send it to the vehicle computer to prevent an accident involving the vehicle doors. For example: the sensor mentioned above can be placed internally or externally on the side mirror assembly, or on the vehicle door itself, or on the external ceiling of the vehicle, etc. One or ordinary skill in the art would recognize that the above mentioned sensor or set of sensors can be placed anywhere in the vehicle without departing from the spirit and scope of the present invention as long as those sensors detect the potential objects that can have an accident with the vehicle door. In addition, one or ordinary skill in the art would also recognize that the sensor or set of sensors can be placed in combination of or solely in any part of the vehicle without departing from the spirit and scope of the present invention.

According to an embodiment of the present invention, any sensors, radars or image recognition software installed in the vehicle can be configured to look for specific objects coming from behind such as bicycle, etc, and if that particular object is identified, then they would transmit that information to the vehicle computer/processor, which would further transmit the signals to proactive vehicle door system to take actions to prevent a potential vehicle door related accident. In this case, regardless if the oncoming object such as bicycle, etc has the potential to hit the vehicle door or not, the proactive vehicle door system would take its actions to prevent a potential accident. One or ordinary skill in the art would recognize that sometimes the objects coming from behind might not demonstrate the probability of hitting the vehicle door initially, however, such objects can change their path at the last minute and can still cause a vehicle door related accident. Therefore, in order to avoid such accidents with specific objects such as bicyclist on a bicycle, etc, the proactive vehicle door system can take its actions if it identifies those objects coming from behind regardless if there is probability of a door accident or not, and that would be considered within the spirit and scope of the present invention. Note: objects that will be monitored regardless of probability of door accident will be preset in the system by the vehicle manufacturer, or the vehicle user will also be provided with a GUI (graphical user interface) to be able to add or update the list of such objects, and that would be considered within the spirit and scope of the present invention.

Such sensors can be either single or a combination of one or more of photo-electric, optic, infrared, radar, sonic, electromagnetic, or any other type of sensors as long as they can do things such as detects the presence of external objects, identify type of external objects, identify shape and/or size of external objects, calculate distance between them and external objects, calculate angle between them and external objects, calculate speed/velocity of external objects coming towards them, calculate time of potential impact from external objects, identify when the user is about to open the door, distinguish external objects as living or non-living objects, and/or gather other necessary information/attributes that can help to prevent an accident. All the information collected by the above mentioned sensors would be constantly sent to the computer/processor of the vehicle that would process that information and further transmit signals to activate or deactivate the automated stopping feature of the vehicle door or doors. One or ordinary skill in the art would recognize that any type of sensor can be used in the vehicle that can gather information and help to prevent an accident, and that would be within the spirit and scope of the present invention. Note: Any of the above mentioned sensors can be installed either internally or externally, however, one or ordinary skill in the art would recognize that even when such sensors are placed behind other objects like metal, etc, they would still continue to function even in those situations.

Note: One of the sensors mentioned above that distinguishes external objects as living or non-living objects would constantly guide (provide the data) for the proactive vehicle door system to act such that when both living and non-living objects have the potential for meeting an accident with the vehicle, then the living objects will be given a preference while preventing any accidents with those living objects as compared to the non-living objects.

When the vehicle door that's being opened reaches close to an external object, then the sensors would inform the vehicle computer to publish a stop message to the vehicle door unit, so the vehicle door would be restricted from opening any further. Such vehicle door can be restricted from opening further in many different ways such as using an automated hook mechanism that inserts its hooks at the designated hole on the vehicle door to stop it from opening further and then unhooks to allow the door to open further. Similarly, a piston can also be used to stop the vehicle door from opening further. Similarly, hydraulic cylinders, automated hinge pin door stop, metal rod door stopper, torsion spring, gears in doors, motor, etc. can also be used to stop the vehicle door from opening further, and so on. One or ordinary skill in the art would recognize that rather than just the examples given above to stop the vehicle door from opening further, any other mechanism can also be used to stop the vehicle door from opening further and that would be within the spirit and scope of the present invention.

As part of this invention, there would also be lasers installed in different parts of the vehicle, which would monitor the surroundings and provide data to the vehicle computer when external objects are identified. Such lasers can be installed either in front, back, sides or top of the vehicle as long as they can monitor the surroundings and provide data to the vehicle computer when external objects are identified.

As part of this invention, there would also be object detection software module within the vehicle computer, which would use one or more cameras installed in the vehicle to capture surrounding external image outside of the vehicle, and would constantly try to detect objects in the image that can potentially cause an accident involving vehicle doors. The said cameras can be installed anywhere inside or outside the vehicle as long as they can capture the surrounding images outside of the vehicle.

Note: Whenever a specific door has been restricted from opening further to prevent an accident, a message would also be displayed on the vehicle notification system (for example: on the vehicle dashboard, or Heads up display, or any other display/audio system in the vehicle) that the door has been restricted from opening further. Also, there can be some type of indicator (for example: a light surrounding the door handle or the door support handle, etc), which will initially continue to display green color to indicate no issues while the door is being opened, but will change to red color when that door has been restricted from opening further to prevent an accident. These features will clearly indicate to the vehicle door operator when it's safe to further open the door and when it isn't. Please note that the indicator about the door being restricted from opening isn't just limited to the green or red lights and too on the door handles, and in fact, it can be any other type of indicator as long as it can convey to the vehicle door operator that the door has been restricted from opening as there can be a potential for accident. (Note: An accident mentioned above can be any type of accident where one vehicle door hits another vehicle or any other object, or it can also be another vehicle or traffic comes and hits the open door of a vehicle, or another type of accident involving a vehicle door, etc.)

Note: In this case, if the external object or oncoming traffic (for example: another vehicle) moves away from its previous location and there is no other object remaining nearby to the opening vehicle door, then the sensor would immediately inform the vehicle computer to publish a 'release' message to the vehicle door unit, so that the vehicle door unit would no longer be restricted and can be opened further as needed.

Even though a vehicle door automatically stops from opening further based on the sensor detection of an external object, there would still be an option for the vehicle user(s) to override that function and manually open the vehicle door further if they wish to do so (this feature would be further mentioned in the document as the manual override function or manual override mechanism).

For example: there can be an instance where another vehicle or traffic is coming from behind or someone (living being like a human, dog, etc) is standing outside the vehicle door, so in that case, the sensors would detect them and restrict the door from opening further. However, in any of those situations, a manual override function would be helpful, where a vehicle user would activate the manual override function and open the vehicle door a little bit to indirectly indicate to the externally present objects (note: those objects that have ability to understand intent) that the vehicle user wants to come out of the vehicle.

On the other hand, there can be an additional feature on the vehicle doors where if an individual is standing outside the vehicle and are also holding the vehicle door handle from outside, then the sensors within the vehicle door's external handle would detect that behavior and the system itself would no longer restrict the vehicle door from opening since the external person is anyways indicating that they also want to open the vehicle door. In other words, there would be no need for the vehicle user to activate the manual override function in this case. Note: However, if the sensors detect other nearby accident prone objects like vehicles, wall, etc, then the door would still automatically stop after reaching the maximum limit so they don't hit those other objects. And in that scenario, manual override function would again be an available option to the users if they still wish to further open the vehicle doors.

Note: One or ordinary skill in the art would recognize that the manual override function can be available in the vehicle in many different ways without departing from the spirit and scope of the present invention and wouldn't be limited to any of the examples given below. For example, as shown in FIG. 7, the manual override function can be in the form of central button available on the dashboard 704, which when activated, would no longer stop any of the vehicle doors from opening based on the sensor detection. Another example of the manual override function can also be a button or manual trigger available on each door that allows the user of that door to active or deactivate the vehicle door's manual override function. For example: as shown in FIG. 7, a small handle 702 can also be provided right behind the vehicle door handle, where a user can put a couple of their fingers on the small handle and couple of fingers on the big handle, and then pull both those handles present on the vehicle door at the same time to activate the manual override function of the vehicle, and therefore, further open the vehicle door.

Note: The manual override mechanism, may be a mechanical button, a software button, an optical sensor, a magnetic switch, a capacitive sensor or any kind of sensor or switch capable of sending a signal or opening or closing a circuit when the user activates it. One or ordinary skill in the art would recognize that any kind of manual override mechanism can be used without departing from the spirit and scope of the present invention. Also, the manual override mechanism can be positioned on the dashboard, on the steering wheel, incorporated into the vehicle's computer user interface, placed in the ceiling, built into the vehicle door itself, built behind the vehicle door handle as a small handle, etc. One or ordinary skill in the art would recognize that the manual override mechanism could be placed anywhere in the vehicle without departing from the spirit and scope of the present invention.

Note: In case if one or more of the sensors isn't able to detect the external object(s) properly or if a sensor isn't working, then it would notify the user in advance. This can be a notification displayed on the vehicle notification system (for example: on the vehicle dashboard, or Heads up display, or any other audio/visual system in the vehicle) that the specific door sensor isn't working properly and therefore the associated door would no longer be automatically restricted from opening due to the sensor problem. One or ordinary skill in the art would recognize that the notification for the sensor not working can be displayed anywhere in the vehicle as long as it's clearly visible to the vehicle users, and that would be within the spirit and scope of the present invention. In addition, there can be some type of indicator (for example: a blinking red light surrounding the door handle or the door support handle, or a sentence 'Sensor not working' Sensor unable to detect objects' highlighted in yellow next to the door handle or the door support handle, etc), which will indicate that the associated door would no longer be automatically restricted from opening due to the sensor problem. In short, any or all of the above mentioned features will clearly indicate to the vehicle door operator that the door would no longer make use of sensors for external object detection. Therefore, they need to be careful while opening the door. One or ordinary skill in the art would recognize that the indicator about the sensor not working isn't limited to the red lights or being on the door handles, and in fact, it can be any other type of indicator in any color and can be placed anywhere in the vehicle as long as it can convey to the vehicle door operator that the object detection sensor isn't working for that door.

It is to be clearly understood that either a single sensor or a plurality of sensors built in or affixed to any part of the vehicle, internally or externally, that can together detect external objects that might hit the vehicle door are within the spirit and scope of the present invention. It is also to be clearly understood that either a single central notification or a plurality of individual notifications can be presented in the vehicle when external objects are detected by sensors that could potentially hit the vehicle door, and that would be within the spirit and scope of the present invention.

In another embodiment of the present invention, when a proactive vehicle door system identifies a potential of a vehicle door related accident, it will alert the vehicle occupant about it, and that would also be considered within the spirit and scope of the present invention. Such an alert can be in the form of flashing light, colored light, voice notification, text notification, symbol notification, etc. One or ordinary skill in the art would recognize that such alert can be in any form as long as it can alert the vehicle occupant about the potential vehicle accident. In addition, such alert can be located anywhere on the vehicle, inside or outside the vehicle, as long as the vehicle occupant can view that alert unless it's a voice alert. For example, alert can be located on the interior side of the vehicle door, trim of the vehicle door, vehicle door handle, border of the vehicle door handle unit, glass window of the vehicle door, smart glass panel or display mounted on the vehicle door, HUD display, trim of the door mirrors, side of the door mirror compartment, sun visor, dashboard display screen, dashboard notification system, seat headrest, display screen on the seat, and/or other existing notification systems present in the vehicle.

Throughout this specification, the invention described herein may be interchangeably referred to as a system, proactive vehicle door system, self-stopping vehicle doors, proactive vehicle doors, self-stopping proactive vehicle doors, vehicle door safety apparatus, vehicle door safety system, door safety mechanism or proactive vehicle doors to prevent accidents. The user can direct the system to perform various available user actions. Throughout the specification, user actions used to control the system may be referred to as commands, instructions, directions, input, gestures, or actions. These actions may be performed by pressing buttons, turning knobs, moving sliders, touching the touch-sensitive screen of the device, double tapping, dragging, pinching, sliding or any other gestures commonly used to interact with a system. One or ordinary skill in the art would recognize that any user action may be used to interact with the proactive vehicle door system.

Note: This invention also comprises of an artificial intelligence module built within the proactive vehicle door system, where if the vehicle user or users tend to often open the vehicle door or doors without reviewing their surroundings, and the door safety mechanism is frequently activated, then the system can learn from those regular actions of the users (such as incorrectly opening the vehicle door at a particular time of the day, or at a particular place, or in a particular sequence of actions, etc) and then proactively inform the user or users to avoid making those same mistakes again, and therefore, prevent future accidents. For example: If a vehicle user of a parallel parked vehicle regularly tends to open the door incorrectly without checking the surroundings on the street, then the artificial intelligence system would proactively alert that user so they don't make the same mistake again. In the case of self-driving autonomous vehicles, artificial intelligence system would not only proactively alert the user, but also store that incident in the memory of the autonomous vehicle's computer, so the autonomous vehicle's computer would use that information in future to avoid vehicle door related accidents. In the case of vehicles with automatically opening doors, artificial intelligence system would not only proactively alert the user, but also store that incident in the memory of that vehicle computer, so the vehicle's computer would use that information in future to avoid vehicle door related accidents.

Note: This artificial intelligence module of the proactive vehicle door system would also be connected/integrated with the vehicle's overall artificial intelligence module, where both the systems would work closely with each other and help to prevent accidents. For example: If the vehicle's overall artificial intelligence module identifies that the vehicle has been parked outside the parking lines in a parking lot, then it would immediately convey that information to the artificial intelligence module of the proactive vehicle door system, which would further inform the users about the potential of an accident and also go into a heightened alert/watch mode to prevent an accident related to the vehicle doors. In this case, the artificial intelligence module of the proactive vehicle door system would also have the ability to turn on additional sensors, cameras, etc within the vehicle, so they can further assist with the heightened alert/watch mode.

Note: This artificial intelligence module can also comprise of a photo/video capture feature, both internal and external to the vehicle, which would capture the photos/videos of the users' actions while opening the vehicle door and store those photos/videos on the memory of the vehicle's computer. The user/s would then be able to review those photos/videos later using the audio visual component 902 of the vehicle and learn from their previous mistakes to prevent future accidents. Note: there would also be a feature available to manually or automatically upload those photos/videos to a user's pre-defined online location or phone using WI-FI, Bluetooth, etc. In addition, this artificial intelligence module would also comprise of a software module to identify and memorize the users in the vehicle, so even if the users sit in different locations of the vehicle at different times, then the artificial intelligence module would still recognize the users and make suggestions based on that user's previous actions related to the opening of the vehicle door. In short, the artificial intelligence module of the proactive vehicle door system would constantly gather, analyze and provide proactive suggestions or even take the necessary actions in order to help prevent future accidents.

Note: There would also be an option to turn off the artificial intelligence module if the vehicle users do not prefer to get the proactive suggestions to prevent accidents related to the vehicle doors.

As shown in FIG. 8, there would also a feature available to switch on/off 802 i.e. activate or deactivate the proactive vehicle door system for all vehicle doors or for individual vehicle doors. Such mechanism to switch on/off i.e. activate/deactivate the proactive vehicle door system can be done in many ways comprising of either a mechanical button, a software button, an optical sensor, a magnetic switch, a capacitive sensor or any kind of sensor or switch capable of sending a signal or opening or closing a circuit when the user activates it, and so on. In addition, this switch on/off feature to activate or deactivate the proactive vehicle door system can be placed anywhere in the vehicle. For example: it can be positioned on the dashboard, on the steering wheel, incorporated into the vehicle's computer user interface, placed in the ceiling, built into the vehicle door itself as a button/switch, built behind the vehicle door handle as a small handle or small switch/button, included at the back of the headrest, etc. One or ordinary skill in the art would recognize that such switch on/off feature to activate/deactivate the proactive vehicle door system can be available in the vehicle in many different ways and can be placed anywhere in the vehicle without departing from the spirit and scope of the present invention.

An example of the switch on/off feature of the proactive vehicle door system can be in the form of a central button available on the dashboard, which when activated (turned on), would continue to prevent accidents by automatically stopping any of the vehicle doors from opening further, alerting the vehicle occupants internally, alerting the external users externally, etc when there is a potential of hitting some external objects. On the other hand, when such switch on/off feature of the proactive vehicle door system is deactivated (turned off), it would no longer restrict any of the vehicle doors from opening further, or alert the vehicle occupants internally, or alert the external users externally, etc even when there is a potential of hitting some external objects. One or ordinary skill in the art would recognize that rather than limiting the switch on/off feature of the proactive vehicle door system to the central button on the dashboard, any other ways or methods to activate or deactivate the proactive vehicle door system can also be used without departing from the spirit and scope of the present invention.

Another example of being able to switch on/off i.e. activate or deactivate the proactive vehicle door system can be in the form of a button or a manual trigger available on each door that allows the user of that door to individually active or deactivate the proactive vehicle door system for their individual door. One or ordinary skill in the art would recognize that rather than limiting the switch on/off feature of the proactive vehicle door system to a button or manual trigger on individual doors, any other ways or methods to activate or deactivate the proactive vehicle door system can also be used without departing from the spirit and scope of the present invention.

According to an embodiment of the present invention, the feature to switch on/off 802 i.e. activate or deactivate the proactive vehicle door system can be further enhanced such that if the user presses the switch on/off 802 to 'off' and quickly removes their finger, then the proactive vehicle door system would temporarily deactivate for a short duration of time, wherein such duration would be preset in the system (for example: 15 minutes). This feature can be especially useful where the users might have shown an intent to open the door (for example: turn off ignition, unbuckle seat belt, etc.), however, the user actually didn't want to open the door immediately and rather wanted to sit in the vehicle for some more time. A vehicle user would have a GUI interface available to them to be able to update the preset deactivate duration associated with switch on/off 802 to another value if they wish to change the default/preset value. On the other hand, proactive vehicle door system can have another feature wherein if the user presses the switch on/off 802 to 'off' and continues to press it for a few seconds (example: 4 seconds, 5 seconds, etc), then the proactive vehicle door system would completely deactivate until the user activates it again manually by pressing the switch on/off to 'on' again at a later time.

According to an embodiment of the present invention, there would also be another feature available to the users either in the form of GUI (graphical user interface) or manual buttons/switches, which would allow the user to turn on/off specific functionalities of the proactive vehicle door system but not all of them. For example: a user would be able to turn off external alerts of the proactive vehicle door system, however, they would continue to get the internal alerts of the proactive vehicle door system and also continue to restrict their vehicle door from opening when there is a potential for vehicle door related accident. In another example, a user would be able to turn off external alerts of the proactive vehicle door system and also turn off automatic restricting or blocking of the vehicle doors, however, they would continue to get the internal alerts of the proactive vehicle door system.

Note: If a vehicle meets with any kind of accident (which can be in any part of the vehicle), and that information was already transmitted to the vehicle computer, then the proactive feature described in this invention about the automatic stopping of the vehicle door from opening further in order to avoid hitting external objects would be immediately deactivated. While the vehicle user/s are already in an accident situation, this automatic deactivating feature would allow the users to be able to immediately get out of the vehicle without worrying or trying to find the manual override function/mechanism (mentioned earlier) to be able to manually open the vehicle door when there are other external objects near the vehicle door.

Note: There would also be an additional water sensor available in the vehicle, which would detect that if the vehicle has partially or fully submerged in water, then in that case also, the proactive feature described in this invention about the automatic stopping of the vehicle door from opening further in order to avoid hitting external objects would be immediately deactivated. While the vehicle is partially or fully submerged in water, this automatic deactivating feature would allow the users to be able to immediately get out of the vehicle without worrying or trying to find the manual override function/mechanism (mentioned earlier) to be able to manually open the vehicle door due to external objects.

According to this invention, a user would also be able to use voice commands instead of operating any of the manual features mentioned in any parts of this invention. For example: using a voice command, a user would be able to activate or deactivate the manual override function of the proactive vehicle door system. In another instance, using a voice command, a user would also be able to activate or deactivate the entire proactive vehicle door system or the individual vehicle doors, and so on. One of ordinary skill in the art would recognize that any mechanically operated feature mentioned in this invention can be replaced with single or a set of voice commands without departing from the spirit and scope of the present invention.

Figure 10:
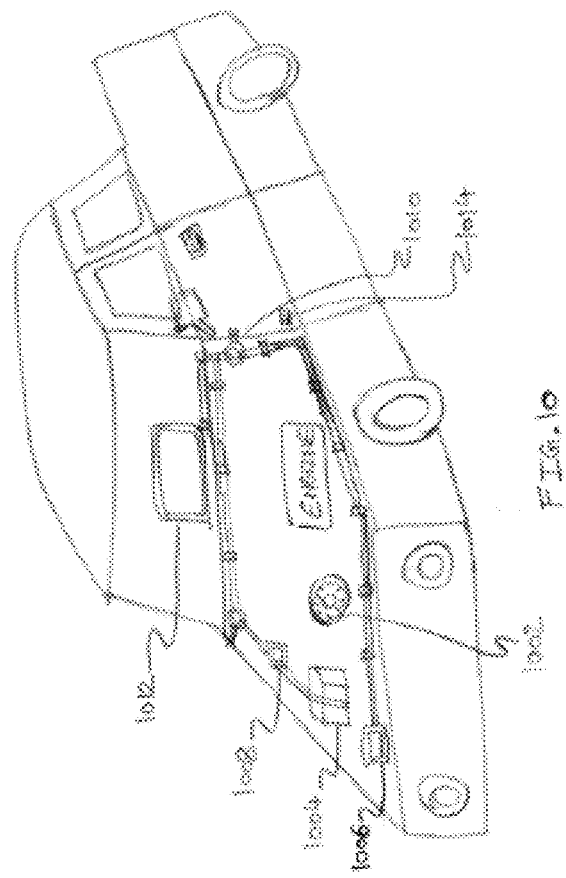
FIG. 10 is a diagram of exemplary power connection from the vehicle's power system to any of the components of the proactive vehicle door system.

As shown in FIG. 10, the power provided for any components/features of the proactive vehicle door system (for example: to stop and/or release the vehicle doors 1010, audio visual notification systems related to the proactive vehicle doors 1012, entire system on/off switch or individual on/off switches for each vehicle door, activate/deactivate manual override function of the proactive vehicle door system, artificial intelligence module related camera/s, display screen/s and/or notification system, etc) would be provided from the power system of the vehicle mainly comprising of the vehicle's alternator 1002, voltage regulator 1006, the vehicle battery 1004, a battery fuse 1008, a built-in rechargeable battery 1014 on all the individual vehicle doors, and the associated wiring and its harness.

While the vehicle's engine is running, the vehicle's alternator 1002 would supply the necessary power for any components/features of the proactive vehicle door system. However, if the capacity of the alternator 1002 is exceeded, then the vehicle's battery 1004 would supply the necessary power for any components/features of the proactive vehicle door system, even though the vehicle's engine might be running. In this case, it would be indicated to the user using an audio/visual notification system that the vehicle's battery 1004 is being utilized to supply the power for any components/features of the proactive vehicle door system.

If the vehicle's engine isn't running, then the vehicle's battery 1004 would supply the necessary power for any components/features of the proactive vehicle door system. In this case, it would be indicated to the user using an audio/visual notification system that the vehicle's battery 1004 is being utilized to supply the power any components/features of the proactive vehicle door system. However, if the vehicle's battery 1004 is about to fully drain out i.e. no more capacity, then rather than using the vehicle's battery 1004, the proactive vehicle door system would use its built-in rechargeable battery 1014. In this case, it would be indicated to the user using an audio/visual notification system that the rechargeable battery 1014 on the proactive vehicle door itself is being utilized to supply the power for any components/features of the proactive vehicle door system.

According to an embodiment of the present invention, any power that's supplied to the proactive vehicle door system would pass through the voltage regular 1006 to control the amount of voltage passed through. Similarly, there would also be a battery fuse 1008 to protect over current being passed through. Note: It is to be clearly understood that any other mechanisms to control the amount of voltage or current that's passed through to stop or release the proactive vehicle doors would be within the scope and spirit of the invention. According to an embodiment of the present invention, the wiring from the alternator and the battery would run parallel through the sides of the engine, and then from the space/hole available, it would go over to the vehicle doors, which would then also be further extended to the dashboard of the vehicle. Similarly, the associated wiring would also be extended to the rear doors. Note: It is to be clearly understood that there are many different ways to run the wiring from the alternator and the battery to any components/features of the proactive vehicle door system, and that's within the scope and spirit of the invention.

According to an embodiment of the present invention, wiring from the vehicle's alternator 1002 or the battery 1004 can also be extended to the HUD system that's interfaced with the proactive vehicle door system to display the vehicle door related notifications to the user.

Note: It is to be clearly understood that there are many different ways to provide power to any components/features of the proactive vehicle door system including wireless charging, etc., and that's all within the scope and spirit of the invention.

One or ordinary skill in the art would recognize that any method or system of affixing, attaching or mounting the self-stopping feature on the vehicle doors may be used without departing from the spirit and scope of the present invention.

According to an embodiment of the present invention, proactive vehicle door system would be able to detect the user intent that they want to open the vehicle door, and that would be considered within the spirit and scope of the present invention. One or ordinary skill in the art would recognize that a number of methods can be used to identify the user intent of opening the door without departing from the spirit and scope of the present invention. For example: there can be a touch sensor behind the vehicle door handle, which would detect when the user touches the handle and would immediately send that information to the vehicle computer, which would further communicate that information to the proactive vehicle door system that there is a potential for the vehicle door to open. Another example is when the user pushes a switch or button, or presses a door open option on display screen, or using a voice command or using a mobile app indicates to the automated vehicle door to open, which would immediately send that information to the vehicle computer, which would further communicate that information to the proactive vehicle door system that there is a potential for the vehicle door to open.

In another example, there can be a sensor in the seat belt buckle, which would detect when the user unbuckles the seat belt and would immediately send that information to the vehicle computer, which would further communicate that information to the proactive vehicle door system that the vehicle door is about to open. In another example, if the user turns off vehicle's ignition, it would immediately send that information to the vehicle computer, which would further communicate the information to the proactive vehicle door system that there is a potential for the vehicle door to open.

In another example, a user can make a sequence or combination of user actions such as turn off ignition and then unbuckle the belt, or unbuckle the belt and then turn off ignition, or other similar sequence or combination of actions, which would indicate that there is a potential for the user to open the vehicle door. In this situation, this information would be sent to the vehicle computer, which would further communicate the information to the proactive vehicle door system that there is a potential for the vehicle door to open. One or ordinary skill in the art would recognize that the sequence or combination of user actions can be either pre-set by the vehicle manufacturer, or using a graphical user interface a user would also have the ability to preset their own sequence or combination of user actions which will inform the vehicle of their intent to open the vehicle door.

In case of self-driving vehicles, when the vehicle door hasn't been opened, however, if the self-driving vehicle is about to open the door i.e. intends to open the door, then the self-driving vehicle would communicate that information to the vehicle computer, which would further communicate that information to the proactive vehicle door system.

Once the user intent of opening the vehicle door is identified, the proactive vehicle door system will take one or more of the following actions comprising of either restricting or blocking the vehicle door from opening, allowing the door to partially open, locking the door, alerting the occupants of the vehicle of any potential hazards, alerting the external users or other self-driving vehicles that the vehicle's door is about to open, etc. One or ordinary skill in the art would recognize that the proactive vehicle door system can either pursue a stand-alone action or any combination or sequence of actions mentioned above without departing from the spirit and scope of the present invention.

According to an embodiment of the present invention, once a vehicle user or users or the automated vehicles demonstrate an intent to open the vehicle door, there can also be one or more display screens activated within the vehicle, which would display the rear view of the vehicle using one or more cameras installed on the vehicle. Such display screen can be considered part of the internal alert mechanism of the proactive vehicle door system, displaying the rear view to the users so they can easily check or view the objects coming from behind and accordingly open their vehicle door. The said display screen can be installed anywhere in the vehicle such that it's visible to the vehicle users. For example: display screen can be installed on the interior side of the door panel, next to the door handle, vehicle dashboard, HUD display, back of the headrest of the vehicle seat for the rear passengers, side glass window, etc. In addition, the said display screen can be either one or multiple, wherein each user can have their own display screen showing the rear view specific to their side of the door, or there can be a central display screen, which can be seen by all vehicle users. The said camera can be installed anywhere on the vehicle, either inside or outside, as long as it can capture the rear view of the vehicle. For example: camera can be installed on the roof of the vehicle, side mirror assembly, bumper of the vehicle, trunk of the vehicle, near the rear lights of the vehicle, near the rear windshield either inside or outside, etc. In another embodiment of the present invention, there can also be outline or highlighting of those objects on the display screen, which have the potential to hit the vehicle door. Such outline or highlighting of the objects would help to easily inform the users of the objects that have the potential to cause an accident. In situations when it's dark outside, the said display screen/screens can also display infrared displays, or show night vision camera views on the screen using infrared cameras or night vision cameras installed on the vehicle. Such infrared cameras or night vision cameras can be installed anywhere similar to regular cameras as long as they can capture the rear view of the vehicle.

In the situation where the vehicle ignition is on, the power for the display screens mentioned above would be provided by the alternator, however, when the ignition is turned off, the power for the display screens would be provided by the battery of the vehicle. The display screens will run on battery for up to a preset maximum duration (for example: up to 10 minutes), thereafter, the display screens showing the rear view will automatically turn off. In the situation where the door was opened and then closed and then the vehicle was locked, then the display screens showing the rear view will immediately turn off once the vehicle is locked. In other words, if the vehicle occupants leave the vehicle and lock it, then the display screens showing the rear view will immediately turn off.

According to an embodiment of the present invention, when a proactive vehicle door system identifies a potential of a vehicle door related accident, it will alert externally that the vehicle door is about to open. One or ordinary skill in the art would recognize that even if the proactive vehicle door system doesn't restrict or block the vehicle door from opening further due to potential of an accident, the proactive vehicle door system can still display an external alert to the users and that would be considered within the spirit and scope of the present invention. In other words, this invention will also have an external alert mechanism (for example: using an indicator, notification, digital display, lights, etc.) that would alert the external/outside people, oncoming traffic or nearby external objects, etc. that the vehicle door is about to be opened, which would also help to prevent accidents.

The proactive vehicle door system will have the ability to detect the user intent of opening the vehicle door (for example: when the vehicle door is unlocked, or when a user holds the vehicle door handle, ignition is turned off, seat belt is unbuckled, button or switch is pressed to open the door, voice request is made to open the vehicle door, request is made on mobile app to open the vehicle door, or a particular action of user which indicates that the user is about to open the vehicle door, or a sequence or combination of user actions which indicate that the user is about to open the vehicle door, etc.) Once the user intent of opening the vehicle door is identified, the proactive vehicle door system would activate an external alert to inform the users or other self-driving vehicles externally that the vehicle door is about to be opened.

One or ordinary skill in the art would recognize that the external alert can be displayed anywhere on the vehicle, either internal or external, as long as it is visible externally. For example: external alert can be in the form a digital display inside the rear windshield showing an animated image of vehicle along with its opening door, or there can be another type of external alert present externally on the vehicle, and so on. In another example, an external alert can also be flashing lights or combination of lights on the rear windshield or on the trim of the door mirror assembly, or on the roof of the vehicle, or on the trunk or bumper of the vehicle, or on the vehicle door assembly itself such that it's visible to the external users or other automated vehicles coming from behind. One or ordinary skill in the art would recognize that the external alert can also be displayed on another display component that's attached to the vehicle, and that would be considered within the spirit and scope of the present invention. For example: there could be an external communication screen attached to the top of the vehicle, especially the self-driving autonomous vehicles, which can also be used to inform external users or other self-driving vehicles that the vehicle's door is about to be opened.

The external alert mechanism/system can be implemented in many different ways. For example: In one instance, the external alert mechanism/system would not depend on the sensors that detect the oncoming traffic or nearby external objects, and would simply activate anytime when the vehicle door is about to be opened. This particular set up of the external alert system itself is sufficient to prevent a lot of accidents involving the vehicle doors by providing the external alerts.

Another instance of the external alert mechanism/system can be implemented such that it would be dependent on the sensors that detect the oncoming traffic or nearby external objects, and only when there is detection of such oncoming traffic or nearby external objects, and if the user decides to open the vehicle door at that time, then the external alert mechanism/system would activate. In other words, this set up of the external alert mechanism/system would activate only when sensors detect potential accident threat rather than activating all the time whenever the vehicle door is opened. One or ordinary skill in the art would recognize that the external alert mechanism/system can be implemented in many different ways rather than limiting it to the examples given above and that would be within the spirit and scope of the present invention.

Note: The external alert mechanism/system can present the alerts in many different ways. For example: there can be LED lights on the vehicle that lit up when the vehicle door is about to be opened, or there can be a display screen at the back and/or front of the vehicle that displays using text, image, etc that the vehicle door is about to be opened, or there can be lights on the edges of the vehicle door itself that would be visible to oncoming traffic and would lit up whenever a vehicle door is about to be opened, and so on. One or ordinary skill in the art would recognize that the external alert mechanism/system can present the alerts externally in many different ways rather than limiting it to any of the examples given above and that would be within the spirit and scope of the present invention.

In another example of an external alert, there can also be a highly reflective thin material such as retroreflective sheeting glued or attached to the vehicle door's inner trim/edge, so if the door was already opened to some extent, then the retroreflective sheeting would shine and provide an alert to the external users or automated vehicles coming from behind that the door is open. This feature would especially be useful during night when it's dark and the retroreflecting sheeting on the vehicle door would shine and alert the external users or other automated vehicles coming from behind.

According to an embodiment of the present invention, connected vehicles that can communicate with other connected objects such as other connected vehicles, connected cycles, connected parking garages, connected infrastructure, smartphones, etc. would also have the proactive vehicle door system in those connected vehicles without departing from the spirit and scope of the present invention. Connected vehicles can use a variety of mechanisms to communicate data or information with other connected objects such as dedicated short-range communications (DSRC) radio signals, Wi-Fi, Bluetooth, GPS, cellular, etc, and therefore, they will be completely aware of their nearby surroundings. In the proactive vehicle door system of the connected vehicle, as soon as a vehicle user or users demonstrate an intent to open the vehicle door, the connected vehicle would transmit that information to other connected objects that are in its range, which would alert those external connected objects as well as their users about the potential or intent of opening of the vehicle door, and therefore, help to prevent door related accidents. In this case, rather than external light, voice alert, etc., the external alert mechanism of the proactive vehicle door system can be considered to be in the form of data that's transmitted from the connected vehicle to other connected objects externally. One or ordinary skill in the art would recognize that instead of transmitting the intent of opening of the vehicle door to all nearby connected objects, the connected vehicle can also identify and transmit that information to just those connected objects that have the potential or probability of meeting with an accident with the connected vehicle's door, and that would be within the spirit and scope of the present invention.

In another situation, even when a potential for a vehicle door related accident isn't yet known or identified in a connected vehicle, however, another connected vehicle identifies a probability of such accident using its sensors, then the second connected vehicle would communicate that information to the first connected vehicle in order to prevent a vehicle door related accident for the first connected vehicle. In this case, if the users of the first connected vehicle were about to open their doors, then the vehicle computer or processor of that first connected vehicle would activate the proactive vehicle door system based on the information received from the second connected vehicle, and therefore, help to prevent vehicle door related accidents. When the proactive vehicle door system is activated, it would either generate an alert for the vehicle users, or generate an external alert for the outside users, or automatically stop the vehicle door from opening further if there was a possibility of an accident involving the vehicle doors or its users. For example: If a bicycle coming from behind is identified by a connected vehicle using its sensors, then it would also communicate that upcoming bicycle information to another connected vehicle that's in its front, which might not have yet identified the upcoming bicycle using its sensors. The vehicle computer or processor of the connected vehicle in the front will activate the proactive vehicle door system in this situation, and therefore, help to prevent a potential vehicle door related accident.

In another embodiment of the present invention, a connected object such as a connected cycle itself will also be able to communicate it's direction, location, speed, etc information to the nearby connected vehicles, which would further activate the proactive vehicle door system of the connected vehicle to generate an internal alert for the vehicle users about the upcoming cycle. One or ordinary skill in the art would recognize that instead of generating an alert to vehicle users about all upcoming cycles, the proactive vehicle door system of the connected vehicle can also just generate an internal external alert if the vehicle users were about to or demonstrated an intent to open the vehicle door, and that would be within the spirit and scope of the present invention. One or ordinary skill in the art would recognize that upon receiving the upcoming cycle information in the connected vehicle, the proactive vehicle door system of the connected vehicle can also be preset to just generate an internal alert, external alert or block the vehicle door from opening if those vehicle users were about to or demonstrated an intent to open the vehicle door, and there was a potential or probability of vehicle door related accident with the cycle, and that would be within the spirit and scope of the present invention.

One or ordinary skill in the art would recognize that the connected vehicles can either directly communicate information with other connected objects, or indirectly pass along the information via using different connected objects. Such direct or indirect external alert mechanism of the proactive vehicle door system in the connected vehicles will also be considered within the spirit and scope of the present invention. For example, a connected cycle will transmit its details to connected road, and thereafter, the connected road will transmit that information to connected vehicle that a cycle is coming towards the connected vehicle, and then the connected vehicle would activate its proactive vehicle door system to prevent a potential vehicle door related accident.

Note: An additional solution can also be used to prevent vehicle door related accidents involving external objects by covering the vehicle door's extreme end points i.e. points that have the most potential of hitting an external object, with a rubber like product that can reduce the possibility of causing any dents, scratches or other damages to those external objects or the vehicle itself.

Another solution that can also be used to prevent some vehicle door related accidents involving external objects by covering the vehicle door's extreme end points, i.e. points that have the most potential of hitting an external object, with a strong repelling magnet which would repel when it gets close to any external objects that are completely or partially made of ferrous components like iron, cobalt, nickel, etc. Therefore, the vehicle door/s wouldn't hit those external objects preventing any damage to those external objects or the vehicle itself. One or ordinary skill in the art would recognize that any other similar solutions can be used to prevent the vehicle door from hitting the external objects and that would be within the spirit and scope of the present invention.

One or ordinary skill in the art would recognize that this invention would be applicable to not only the manually operated vehicle doors but also to the automatic vehicle doors that open on their own and that would be within the spirit and scope of the present invention. The said automatic vehicle doors can either open automatically based on input received from the vehicle user such as press of a button to open door, voice request, etc, or the door can also automatically open based on vehicle computer request like in the self-driving cars.

One or ordinary skill in the art would recognize that this invention would be applicable to not only the vehicle doors of traditional vehicles but also any autonomous self-driving vehicles or the connected vehicles or the semi-autonomous vehicles, and that would be within the spirit and scope of the present invention. In other words, this invention would be applicable to any type of vehicles that have doors or an opening to be able to come out of the vehicle.

One or ordinary skill in the art would recognize that this invention would be applicable to all vehicles that have doors regardless of how those doors open (for example: doors that open externally, open internally, open on the side as sliding doors, open towards the top, open towards the bottom, etc) and all of those would be within the spirit and scope of the present invention.

One or ordinary skill in the art would recognize that this invention would be applicable to each and every door of the vehicle (for example: driver door, front passenger door, rear passengers doors, side doors, back door, front door, etc) and all of those would be within the spirit and scope of the present invention.

One or ordinary skill in the art would recognize that throughout this specification oncoming traffic can be any moving object or person that can come and hit the vehicle door. For example: another vehicle, cyclist, motorbike, scooter, people, etc. In addition, throughout this specification, oncoming traffic can be interchangeably referred as another vehicle or vehicle for ease of understanding.

Many alterations and modifications may be made by those having ordinary skill in the art without departing from the spirit and scope of the embodiments. Therefore, it must be understood that the illustrated embodiment has been set forth only for the purposes of example and that it should not be taken as limiting the embodiments as defined by the following embodiments and its various embodiments.

Therefore, it must be understood that the illustrated embodiment has been set forth only for the purposes of example and that it should not be taken as limiting the embodiments as defined in this invention. For example, notwithstanding the fact that the elements of this invention are set forth below in a certain combination, it must be expressly understood that the embodiments includes other combinations of fewer, more or different elements, which are disclosed in above even when not initially presented in such combinations. A teaching that two elements are combined in a presented combination is further to be understood as also allowing for a combination in which the two elements are not combined with each other, but may be used alone or combined in other combinations. The excision of any disclosed element of the embodiments is explicitly contemplated as within the scope of the embodiments.

The words used in this specification to describe the various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of this invention, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in this invention or that a single element may be substituted for two or more elements in this invention. Although elements may be described above as acting in certain combinations, it is to be expressly understood that one or more elements from a combination can in some cases be excised from the combination and that the combination may be directed to a sub-combination or variation of a sub-combination.

Insubstantial changes from the presented subject matter as viewed by a person with ordinary skill in the art, now known or later devised, are expressly contemplated as being equivalently within the scope of this invention. Therefore, obvious substitutions now or later known to one with ordinary skill in the art are defined to be within the scope of the defined elements.

The invention is thus to be understood to include what is specifically illustrated and described above, what is conceptually equivalent, what can be obviously substituted and also what essentially incorporates the essential idea of the embodiments.

What is claimed is:

1. A vehicle door safety system comprising:
   a vehicle;
   a processor;
   one or more sensors embedded in said vehicle;
   non-volatile memory comprising computer readable instructions stored therein, wherein said instructions cause said processor to:
      detect, using said one or more sensors, when the occupant of said vehicle demonstrates an intent to open the door of said vehicle without opening the door;
      wherein said intent to open the door of said vehicle is a stand-alone user action or a combination of user actions which indicate that the occupant of said vehicle is about to open the vehicle door; and
      cause a door safety mechanism to generate one or more external alerts directed to a person or object located outside of said vehicle when the occupant of said vehicle demonstrates an intent to open the door of said vehicle.

2. The vehicle door safety system of claim 1, wherein said processor deactivates said one or more external alerts when an occupant of said vehicle either no longer demonstrates an intent to open the door of said vehicle, or the occupant opens and closes the door of said vehicle, or manually turns off the door safety mechanism.

3. The vehicle door safety system of claim 1, wherein said intent to open the door of said vehicle is manifested as one or more detectable steps that precede a vehicle door-opening operation performed by an autonomous or semi-autonomous vehicle.

4. The vehicle door safety system of claim 1, wherein said vehicle communicates information about an intent to open the door of said vehicle to a nearby object that is communicatively connected to said vehicle in order to help prevent vehicle door related accidents.

5. The vehicle door safety system of claim 1, further comprising:
   a highly reflective material that is adhered or attached to said vehicle door's inner trim or edge, wherein when the door of said vehicle is opened, said reflective material shines or illuminates and provides an alert to an external user or automated vehicle that the door of said vehicle is open.

6. The vehicle door safety system of claim 1, wherein said processor is operably connected to said door safety mechanism and is configured to:
   receive sensor data about the vehicle's external environment collected by a plurality of sensors integrated into the vehicle;
   identify an object in the vehicle's external environment that represents a potential contact hazard when a door of said vehicle is opened;
   cause said door safety mechanism to generate one or more alerts directed to an occupant of said vehicle;
   wherein said one or more alerts are located either inside or outside the vehicle as long as the alerts are visible to an occupant of said vehicle.

7. The vehicle door safety system of claim 6, wherein when one or more sensors embedded in the vehicle identify that an occupant of said vehicle has demonstrated an intent to open the door of said vehicle, said door safety mechanism generates one or more internal alerts directed to an occupant of said vehicle when said object in the vehicle's external environment represents a potential contact hazard.

8. The vehicle door safety system of claim 6, wherein said one or more internal alerts include a visual indicator either on said vehicle door, glass window, door mirror assembly, HUD display or dashboard display screen of said vehicle as long as said visual indicator is visible to occupant of said vehicle.

9. The vehicle door safety system of claim 6, wherein said one or more internal alerts include activation of display screens within the vehicle that display a rear view of the vehicle using one or more cameras installed on the vehicle.

10. The vehicle door safety system of claim 6, wherein said object in the vehicle's external environment is communicatively connected to the vehicle and communicates information about a location of said object, a speed of said object, a direction of said object, or a type of said object to the vehicle.

* * * * *